(12) United States Patent
Sakai

(10) Patent No.: US 9,097,905 B2
(45) Date of Patent: Aug. 4, 2015

(54) POLARIZED LENS

(71) Applicant: Shuyu Co., Ltd, Fukui (JP)

(72) Inventor: Yuichi Sakai, Fukui (JP)

(73) Assignee: SHUYU CO., LTD., Fukui (JP)

( * ) Notice: Subject to any disclaimer, the term of this patent is extended or adjusted under 35 U.S.C. 154(b) by 0 days.

(21) Appl. No.: 14/091,670

(22) Filed: Nov. 27, 2013

(65) Prior Publication Data

US 2014/0146379 A1    May 29, 2014

(30) Foreign Application Priority Data

Nov. 28, 2012    (JP) ................. 2012-259602

(51) Int. Cl.
  *G02F 1/03*   (2006.01)
  *G02B 27/28*  (2006.01)
  *G02C 7/12*   (2006.01)

(52) U.S. Cl.
  CPC   *G02B 27/28* (2013.01); *G02C 7/12* (2013.01); *G02C 2202/16* (2013.01)

(58) Field of Classification Search
  CPC ......... G02C 7/10; G02C 7/02; G02C 2202/00
  USPC .......... 359/241, 240, 238, 237, 437, 485.02, 359/440, 581, 642, 664, 805, 810; 264/1.32, 1.7; 156/99, 103, 242; 351/159.01, 232, 233
  See application file for complete search history.

(56) References Cited

U.S. PATENT DOCUMENTS 7,964,120 B2 *   6/2011   Hsu ................. 264/2.7
8,356,895 B2 *   1/2013   Jackson et al. ...... 351/159.01

FOREIGN PATENT DOCUMENTS

JP   2005-121697   5/2005
WO  2009/054835   4/2009

* cited by examiner

*Primary Examiner* — Tuyen Tra
(74) *Attorney, Agent, or Firm* — Wenderoth, Lind & Ponack, L.L.P.

(57) ABSTRACT

A thin and lightweight polarized lens has a laminated structure having a polarized film provided in a sandwiched manner. A glass lens is provided on a front side of the polarized film and a resin lens is provided on a back side of the polarized film, and the resin lens on the back side has a thickness of a range from 0.05 mm to 0.50 mm.

4 Claims, 2 Drawing Sheets

POLARIZED LENS

BACKGROUND OF THE INVENTION

1. Field of the Invention

The present invention relates to a polarized lens reduced in weight and thickness for making glasses convenient to wear.

2. Prior Art

Sunlight is a mixed wave of a longitudinal wave and a transversal wave, and a polarized lens having an optical anisotropic aspect is configured to select one of oscillating waves from the longitudinal wave and the transversal wave and allow the selected wave to pass through and block the other wave from passing therethrough when the sunlight passes through the polarized lens. Therefore, the polarized lens prevents glaring of water surfaces, road surfaces, or roof tiles due to reflected sunlight, protects wearer's eyes from blinding light, and is an optimum lens for the strong sun in summer. If only shielding the sunlight is wanted, sunglasses will do. However, the sunglasses do not have a function to block one of the oscillating waves of the sunlight, and hence cannot prevent the glaring of the reflected light completely.

The polarized lens has a structure in which a polarized film is laminated on a transparent glass layer. FIG. 3 illustrates a cross section of a general polarized lens of the prior art, in which a front side glass lens "a", a back side glass lens "b", and a polarized film "c" are laminated. When light enters the front side glass lens "a", one of the oscillating waves, that is, one of the transversal wave and the longitudinal wave, is blocked by the polarized film "c" from passing therethrough, and one of the oscillating waves is allowed to pass through the back side glass lens "b". Here, the thickness of the front side glass lens "a" is approximately 1.0 mm, and the thickness of the back side glass lens "b" is approximately 1.0 mm, so that a generally thick lens is achieved.

Although the polarized film "c" is very thin and hence is lightweight, the front side glass lens "a" and the back side glass lens "b" are thick and heavy. Therefore, the weight of the polarized lens having a laminated structure as illustrated in FIG. 3 is increased, and the front portion of the glasses becomes heavy. In particular, such a structure does not conform to a requirement of glasses of recent years in which lightweight glasses have become mainstream. Even though the weight of the frame structure is reduced, such a reduction of the weight makes no sense if the lenses to be fitted into rims of the front portion of the frame are heavy.

A polarized lens having a polarized film sandwiched between plastic lenses (resin lenses) is also known. If the plastic lens (resin lens) is employed, the weight is reduced in comparison with the glass lens. However, a stiffness of the polarized lens is lowered. Therefore, when fitting the polarized lens of this type to the rim, internal distortion may occur due to differences in rim shape and dimensions, whereby polarizing performance may deteriorate.

"Polarized lens and method of making polarized lens" disclosed in JP-T-2011-501235 (WO2009/054835) describes a polarized lens including a polarized polyvinyl alcohol (PVB) film, a first epoxy layer on one surface of the PVB film, and a second epoxy layer on the other surface of the PVB film, wherein the combined PVB film and the epoxy layers are practically prevented from breakage, cracking, or optical deformation.

"Spectacle lens equipped with polarizing function and electromagnetic wave preventing function" disclosed in JP-A-2005-121697 provides a polarized lens having a polarized base body and triacetate films stuck to both surfaces thereof, wherein a metal is attached to a surface of a woven fabric or the like such as polyester, a conductive mesh applied with copper plating and black plating thereon is placed on the polarized base body and then is laminated with triacetate films so as to block an electromagnetic wave.

In this manner, although technologies relating to the polarized lens are known, there is no lightweight polarized lens with a thin profile. Since the polarized lens has a sandwich structure in which a polarized film is sandwiched from both sides, the weight is increased by necessity. Although the glaring water surfaces, road surfaces, or roof tiles due to reflected sunlight are prevented and wearer's eyes are protected from blinding light of the strong sun in summer, problems of the weight of the glasses being increased, or the thickness of the polarized lens increased still exist.

SUMMARY OF THE INVENTION

As seen above, the polarized lenses of the prior art have the problems as described above. Accordingly, in order to solve the above-described problems, it is an object of the invention to provide a lightweight polarized lens with a thin profile, and that is user friendly.

A polarized lens of the invention includes a polarized film sandwiched between transparent or translucent layers from both sides thereof, and basically has a common structure as the polarized lens of the prior art. However, the polarized lens of the invention has a configuration in which a glass lens is laminated on one of the front side and the back side, and the resin lens is laminated on the other side. Here, the thickness of the glass lens is not limited, and generally may be the same as the prior art. In contrast, the resin lens used on the other side has a very thin profile from 0.05 mm to 0.50 mm.

Although the polarized film is stuck on the glass lens, the resin lens may be stuck on the polarized film or may be molded by pouring a fused resin. In other words, the resin lens is molded by sticking with an adhesive agent the thin resin lens having a thickness of 0.05 mm to 0.50 mm to the glass lens having the polarized film stuck thereon, or by dropping the fused resin on the polarizing film, bringing a mold which does not adhere to the resin into tight contact therewith and separating the mold later.

The resin lens is formed of a material which has a binding property with respect to the polarized film and vice versa. The polarized lens of the invention may be formed into a prescription polarized lens and may be formed into a non-prescription polarized lens. When forming the polarized lens as the prescription polarized lens, a suitable prescription lens is used as the glass lens. The glass lens may be a photochromatic lens provided with a light modulating function.

The polarized lens of the invention has a laminated structure in which the polarized film is sandwiched by the glass lens and the resin lens and the resin lens has a smaller specific gravity than the glass lens and the thickness thereof is reduced. Therefore, the weight is very much reduced in comparison with the laminated polarized lens of the prior art formed by sandwiching a polarized film between the front side glass lens and the back side glass lens.

Further, the thickness of the polarized lens is very much reduced, and hence the polarized lens of the invention matches a case of being fitted to lightweight and slim frames without any change from a general lens. In other words, a heavy and thick polarized lens as in the prior art cannot match with lens frames of recent years formed of a thin wire rod. However, the polarized lens of the invention may be employed for any frames owing to its lightweight and thin profile.

Furthermore, when fitting the polarized lens to the rim, distortion caused by a stress or the like is generated. Such a distortion may be caused by an internal stress remaining in the lens when the lens is molded as a matter of course. However, such a distortion occurs often when the shapes of the lens and the rim do not match or when the lens curve and the curve of the groove of the frame do not match. In the invention, the distortion occurring when the polarized lens is mounted into the rim is suppressed by increasing the stiffness of the polarized lens with use of a glass lens on one side, and the remaining stress at the time of molding is suppressed as much as possible by employing the resin lens having a thin profile on the other side.

DETAILED DESCRIPTION OF THE PREFERRED EMBODIMENTS

Figure 1:
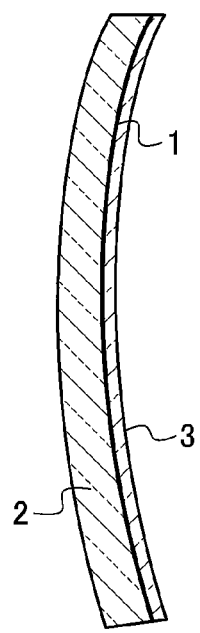
FIG. 1 is a vertical cross sectional view illustrating a polarized lens according to an embodiment of the invention.
Figure 2:
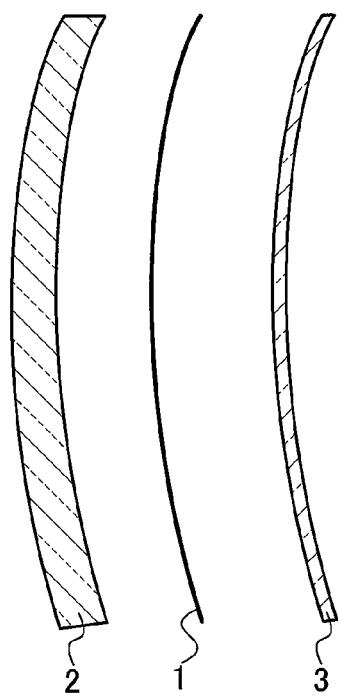
FIG. 2 is a vertical cross-sectional view illustrating the same polarized lens in an exploded manner.
Figure 3:
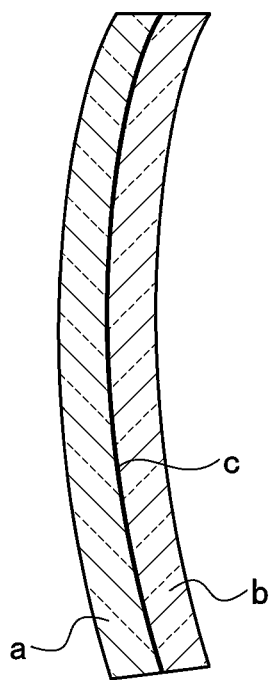
FIG. 3 is a vertical cross-sectional view illustrating a polarized lens of the prior art.

FIG. 1 and FIG. 2 illustrate a cross section of a polarized lens according to an embodiment of the invention. In these drawings, reference numeral 1 denotes a polarized film, reference numeral 2 denotes a glass lens and reference numeral 3 denotes a resin lens. The polarized lens illustrated in these drawings has a laminated structure in which the polarized film 1 is sandwiched by the glass lens 2 and the resin lens 3 from both sides, and the glass lens 2 is provided on the front side and the resin lens 3 is provided on the rear side. It is also possible to adopt a laminated structure in which the resin lens is arranged on the front side and the glass lens is arranged on the back side.

The polarized film 1 is stuck on the back side of the glass lens 2 and the resin lens 3 is stuck on the back side of the polarized film 1. Here, the resin lens 3 may be formed by dropping fused resin on the polarized film 1 and bringing a mold which does not adhere to the resin into tight contact therewith and separating the mold later. In this manner, the polarized lens having the resin lens 3 laminated on the back side of the polarized film 1 is achieved. Here, there is a case where an adhesive agent is applied on both surfaces of the polarized film 1 in advance as needed.

In manufacturing of the polarized lens of the invention, there are cases as follows. (1) A polarized film is stuck to a glass lens via an adhesive agent, and a fused resin is dropped onto the polarized film to form a resin lens. In this case, the fused resin is poured onto the polarized film, a mold is placed thereon and the resin is dried at a predetermined temperature, and then the mold is separated. Accordingly, the fused resin finally becomes a thin resin lens. (2) A polarized film is stuck to a glass lens via an adhesive agent, and a resin lens is stuck to the polarized film via an adhesive agent.

The polarized film 1 is a transparent film having an optical anisotropic aspect and, for example, is a film provided with a polarizing performance which allows only polarized light oscillating in a certain direction to pass therethrough by adsorbing iodine in a polyvinyl alcohol (PVB) or dying a polyvinyl alcohol with a dye, and stretching and/or orienting the resulting material. However, the detailed type and structure of the polarized film 1 are not limited in the invention.

The polarized lens of the invention is reduced in as well as weight. FIG. 2 illustrates respective layers of the polarized lens in a separated manner. The glass lens 2 on the front side has a thickness of general lens for eyewear, and the thickness of the resin lens 3 on the back side has a thickness of a range from 0.05 mm to 0.50 mm. Therefore, in the polarized lens of the invention, since the polarized film 1 and the resin lens 3 on the back side are extremely thin, the practical thickness thereof is not much different from the general lens for eyewear.

Therefore, the polarized lens of the invention may be fitted to lens frames of recent years formed of a thin wire rod without any feeling of strangeness. The polarized lens of the invention is lightweight so that light glasses are achieved.

Further, a photochromatic lens may be used as the glass lens 2. The photochromatic lens is a lens having a function that adjusts the amount of light by changing the color consistency of itself depending on the amount of ultraviolet light in the environment thereof, and is obtained by mixing a lens material with silver halide and coloring or decoloring the same by a reversible binding between halogen and silver caused by ultraviolet light. By using the photochromatic lens instead of the glass lens 2, a lens provided with a polarizing function and a light modulating function is achieved.

What is claimed is:

1. A polarized lens comprising:
    a glass lens;
    a resin lens; and
    a polarized film sandwiched between the glass lens and the resin lens, wherein
    a first surface of the polarized film is laminated on the glass lens and a second surface of the polarized film is laminated on the resin lens so as to form a laminated structure,
    the resin lens has a thickness of a range from 0.05 mm to 0.50 mm, and
    the thickness of the resin lens is smaller than a thickness of the glass lens.

2. The polarized lens according to claim 1, wherein the resin lens is formed by dropping a fused resin onto the glass lens having the polarized film stuck thereon, bringing a mold which does not adhere to the resin into tight contact therewith, and separating the mold later.

3. The polarized lens according to claim 2, wherein the glass lens is a photochromatic glass lens having a light modulating function.

4. The polarized lens according to claim 1, wherein the glass lens is a photochromatic glass lens having a light modulating function.

* * * * *